No. 659,407. Patented Oct. 9, 1900.
C. T. MEREDITH.
MACHINE FOR COMPUTING NUMBERS.
(Application filed June 25, 1900.)
(No Model.)
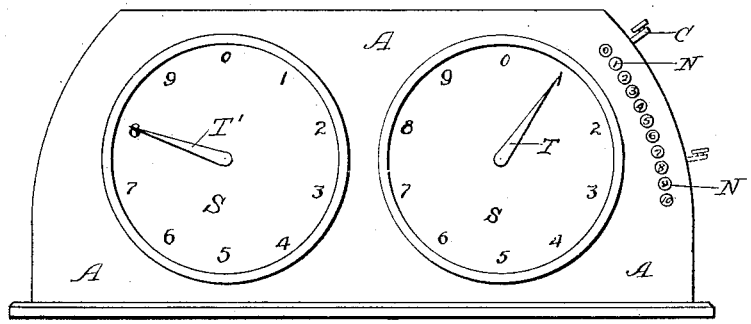
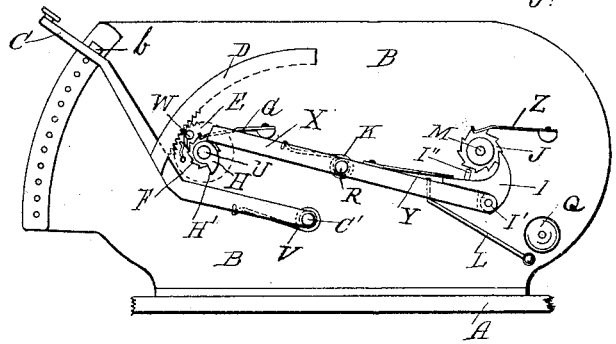
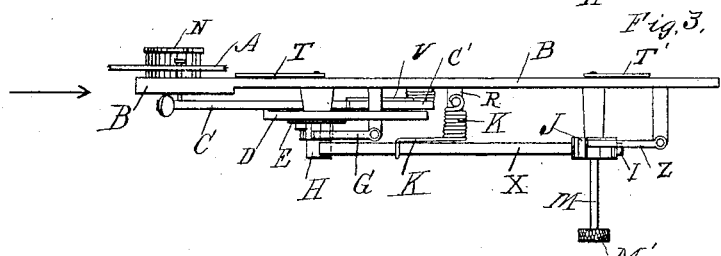
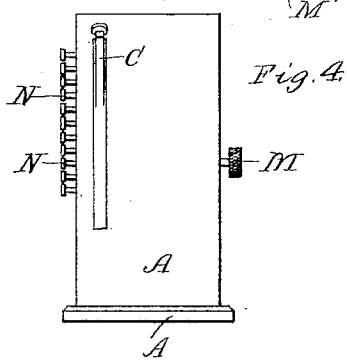
Witnesses.
M. McGinnis
E. Boyd.
Inventor
C. T. Meredith
by Hazard & Marphan
Attorney

UNITED STATES PATENT OFFICE.

CHARLES T. MEREDITH, OF SAN DIEGO, CALIFORNIA.

MACHINE FOR COMPUTING NUMBERS.

SPECIFICATION forming part of Letters Patent No. 659,407, dated October 9, 1900.

Application filed June 25, 1900. Serial No. 21,562. (No model.)

*To all whom it may concern:*

Be it known that I, CHARLES T. MEREDITH, a citizen of the United States, residing at San Diego, in the county of San Diego and State of California, have invented new and useful Improvements in Machines for Computing Numbers, of which the following is a specification.

My invention relates to devices for computing numbers; and the object thereof is to provide a machine for calculating purposes to illustrate the uses of numbers and to make the mental processes, or, to speak more definitely, the actions of the mind in the processes of addition and multiplication, more automatic. I accomplish these objects by means of the mechanism hereinafter described and shown in the accompanying drawings, in which—

Figure 1 is a front elevation of the machine. Fig. 2 shows the rear elevation of the working mechanism. Fig. 3 gives a top view of parts shown in Fig. 2. Fig. 4 is an end view looking in the direction indicated by the arrow in Fig. 3. Fig. 5 is a detail mechanism of the number-regulating key, showing its position in dotted lines when in the locked position. Fig. 6 is a modification of the mechanism to lock the number-regulating key.

My device is described and operated as follows: A is the case, on the front side of which is displayed a number of dials S, each dial exhibiting the Arabic numerals "0" to "9," inclusive, one for registering units, one for tens, &c. The working machinery is mounted on the frame B. In the center of the dials S are rigidly mounted the dial-fingers T and T' on shafts U and M, rotatively mounted in frame B. The actuating-lever C is pivoted at C' and held in its elevated position by the spring V. To the lever C is attached a segmental rack D, which engages a gear E, loose on the shaft U, provided with a spring-pressed pawl W, adapted to carry with it a ratchet-wheel F, keyed to the shaft U, and turn the dial-finger T, affixed thereon. The spring G will permit the rotation in one direction of the ratchet-wheel F, carrying the dial-finger T, but will prevent its movement in the reverse direction. A cam-wheel H, keyed to the shaft U, contacts with and raises the lever X, as the point H' passes under the lever.

The other end of lever X is provided with a dog I, pivotally mounted at the point marked I'. This dog engages a ratchet-wheel J, mounted on a shaft M, which carries the dial-finger T'. On this dog I is a pin I'', which engages the teeth of the ratchet-wheel J, preventing its rotating more than one tooth at each elevation of the dog I or when the spring K causes the lever X to rotate the wheel J. A spring Y on the lever X holds the catch on the dog I in contact with the ratchet-wheel J, and a spring-pawl Z prevents any motion of ratchet-wheel J when the dog I and the pin I'' are not in connection with the said ratchet-wheel J. On the lever X is fastened a resilient bar L, which when the lever X drops over the point H' of the cam H causes the striker at the end of bar L to strike the bell Q. The shaft M, which passes through the ratchet-wheel J, is prolonged and carries a thumb-piece M', by which the dial-finger T' can always be returned to its zero-point without operating the rest of the mechanism. The number-regulating keys N, numbered from "0" to "9," inclusive, are so arranged that when one of these keys is pressed in the lever C when brought down strikes the inner end N' and regulates the distance through which the loose gear E will move, which in turn determines the number of teeth in the ratchet-wheel F to be moved forward by the pawl W in its motion around with the loose gear E. When the lever C is released, its free end is returned by the spring V to its upper position against the stop b. The number-regulating keys N, (see Fig. 5,) passing through the casing A, are held in their outer position by the spring O pressing against the collars c on the stem of the key N. When it is desired to lock any one of these keys, it is pushed in and to one side, so that a slot N'' in the stem of the key will engage the casing A and hold the key in the position indicated by the dotted lines, in which position it will remain until released. The same end may be obtained in a better manner, but with a little more expense in manufacture, by an arrangement as shown in Fig. 6. When constructed as shown in Fig. 6, N'' will represent the slot in the stem of the key. *d* is a pawl pivoted at *e* and held in its normal position, as shown in Fig. 6 in full lines. To lock the key, the pawl is pressed down into the slot. (Shown in dotted lines.)

Work in teaching arithmetic in the common schools is the most imperfect in the very first steps, the poorest results being achieved in addition and multiplication. This machine is intended for educational uses and is designed to illustrate the mental processes of addition and multiplication in the decimal system as matters of perception instead of reason. To comprehend units in quantities, they are grouped into tens, these into hundreds, &c. The increase of the number of units is illustrated by merely pulling down the lever C until it contacts with the stop "one." This will carry the dial-finger to the number "1" on the dial-plate of units. Releasing the lever, it is carried back to its normal position; but the dial-finger will remain stationary. To add any number to one already indicated on the dial-plate, press the key marked with the desired number—for example, "6"—and pull down the lever until it contacts with that key. This will cause the dial-finger to swing around six points more, when it will point to "7." Whenever the combination reaches or exceeds the number ten, the bell is rung and the finger on the tens-dial moves one point, while that of the units passes to or over the zero-point, according to the value of the number added.

To teach multiplication with this instrument, lock the key, showing the number to be repeated. Suppose that the product of four times seven is wanted or the table of fours. Lock the "4" key, then pull the lever once, twice, three times, &c., and the dial-fingers will point to "4," "8," "12," &c.

The numbers on the dial-plates may be colored with different colors in order to show the sequence of odd and even numbers, the fact that two odd numbers in addition give an even, and an even and an odd give an odd, and so forth.

The number of dials and pointers may be increased as described.

Having described my invention, what I claim is—

1. In a machine for calculating numbers provided with a plurality of dial-plates, displaying numerals thereon and having index-fingers mounted therein, and operatively connected with an operating-lever, and adapted, when rotated, to point out the different numerals on the dial-plate; a plurality of number-regulating keys, having numerals marked thereon, usually ten in number, workably mounted in the frame of the device, and adapted to limit the movement of the operating-lever when pressed into the path of movement of the lever, whereby the number indicated on the key pressed in will be pointed out on the dial-face by the dial-finger.

2. A device for adding, and multiplying numbers, comprising the frame A, having a plurality of dial-plates thereon, marked with the numerals from "0" to "9" inclusive, index-fingers T, T' &c., rotatively mounted in the center of said dial-plates, and arranged to point to the different numerals on the dials as the fingers move around on said dial-plate, a series of number-regulating keys N, movably mounted in said frame and adapted to limit the stroke of the operating-lever when pressed into the path of the free end of the lever, an operating-lever C, carrying thereon a segmental rack D; a spur-gear E, loosely journaled on the shaft U and engaging the gear on the rack D; a ratchet-wheel F keyed to the shaft U; the rock-lever X, pivoted to said frame, one end adapted to rest upon a circular cam H; the circular cam H, keyed to said shaft and having projecting point H'; a spring G mounted on the rock-lever and adapted to engage the teeth on the spur-gear E, permitting a movement of said gear in one direction only, a spring K rigidly affixed to shaft R and adapted to bear upon and press the rock-lever against the cam H; the dog I rotatively mounted on said lever and adapted to engage catches on the ratchet-wheel J; the spring Y rigidly affixed to the rock-lever and engaging projections on the dog I, and adapted to hold the pointed end of the dog in engagement with the ratchet; the ratchet-wheel J keyed to the journal M; the spring Z affixed to the frame, the free end adapted to bear against the ratchet J, and engage the teeth thereon, permitting a movement of the ratchet in one direction only; the dial-fingers T, T' keyed respectively to the shafts U and M; the resilient arm L affixed to the rock-lever X, and having on the free end thereof a striker adapted to strike and ring the bell Q immediately after the end of the rock-lever passes over the point H' on the cam H; the shaft M carrying the dial-finger T' and having on the opposite end the thumb-piece M'.

In witness that I claim the foregoing I have hereunto subscribed my name, this 16th day of June, 1900, at San Diego, California.

CHARLES T. MEREDITH.

Witnesses:
S. W. KROFF,
HARRY FISHER.